June 19, 1934.     K. G. A. BÄCKDAHL     1,963,690
STABILIZING AND SPRING CONTROLLING DEVICE Filed April 30, 1932     4 Sheets-Sheet 4

Fig. 6.

INVENTOR.

Karl Gusty Alfred Bäckdahl

Patented June 19, 1934

1,963,690

UNITED STATES PATENT OFFICE 1,963,690

STABILIZING AND SPRING CONTROLLING DEVICE

Karl Gustaf Alfred Bäckdahl, Stockholm, Sweden, assignor to Packard Motor Car Company, Detroit, Mich., a corporation of Michigan Application April 30, 1932, Serial No. 608,488

32 Claims. (Cl. 267—11)

My present invention relates to spring-controlling and stabilizing devices or so called stabilators for vehicles, as for instance automobiles and the like, and more particularly to controlling means for such stabilators.

One object of my invention is to provide a stabilator for vehicles permitting a relative movement between the wheel carrying member and the frame on the one side of the vehicle to be transmitted to an equal relative movement between the corresponding parts on the other side of the vehicle.

Another object of my invention is to provide a stabilator of the type referred to which in normal running of the vehicle is out of operation but which is operatively set into operation under the influence of any factor or factors depending on the running conditions of the vehicle, as for instance the vehicle speed, the steering angle or the like. Such controlling means may be adapted to set the stabilator into operation, when the velocity of the vehicle exceeds a given value and/or when the steering wheel is turned through a given angle, for instance for taking a curve. Preferably, the controlling means of the stabilator is adapted to be actuated by the centrifugal force set up, when the vehicle is travelling through a curve, the stabilator being operatively set into operation, when said centrifugal force exceeds a given value. Such operatively or automatically functioning controlling means may be of any type, for instance electric, mechanical, hydraulic, pneumatic. In some cases it may be suitable to provide the stabilator with double or multiple controlling means, for instance of different types, acting independently of each other to be sure that one of said means will always function, if another would fail.

A further object of my invention is to provide a stabilator of the type described which in addition to single, double or multiple controlling means acting operatively or automatically is provided with manual means to set the stabilator into operation.

Still another object of my invention is to provide a stabilator of the type described in which the automatic controlling means may be adjusted so as to allow variation of the value of the influencing factor, for instance the centrifugal force, at which said means is adapted to set the stabilator into operation.

With these and other objects in view my invention consists in the new and useful construction, combination and arrangement of parts hereafter fully described and illustrated in the accompanying drawings showing embodiments of my invention, but it is to be understood that changes, variations and modifications coming within the scope of the matter claimed hereafter may be resorted to.

In the drawings:—

Like reference numerals designate the same parts in all figures.

Figure 1:
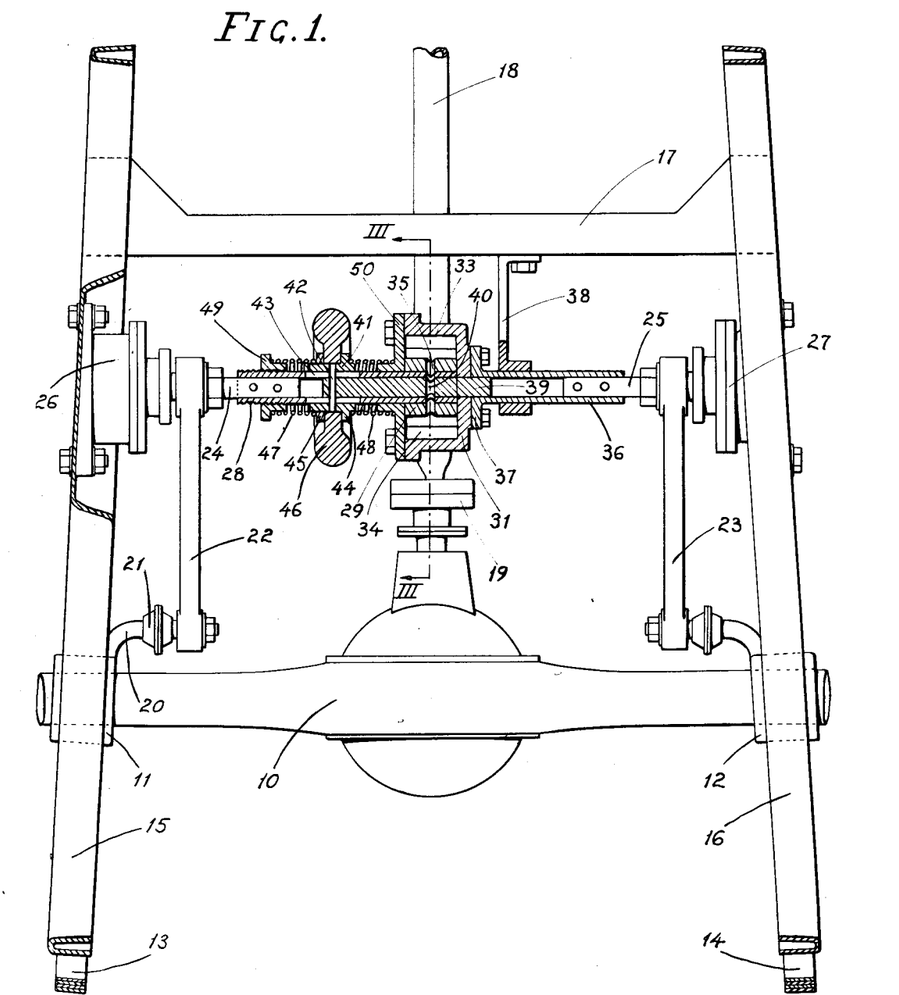
Fig. 1 is a plan view of the rear portion of an automobile chassis provided with an apparatus according to my invention in one of its simplest embodiments, this figure serving also the purpose of illustrating the principle on which the invention is based.

In Fig. 1 a plan view in part in section of an embodiment of the apparatus is shown mounted in an automobile chassis of conventional design having the rear axle 10. Connected to each of the ends of said rear axle 10 by means of a spring plate 11 and 12, respectively, is a longitudinal rear spring 13 and 14, respectively, each of said springs supporting a frame side member 15 and 16, respectively, which side members are connected with one another by means of a cross member 17. The motor power is transmitted to rear axle 10, by means of a propeller shaft 18 and a rear universal joint 19.

Bolted to the spring plate 11 on rear axle 10 is an arm 20 connected by means of a ball-jointed link 21 with a lever 22. In the same manner a lever 23 on the opposite side of the vehicle is connected with spring plate 12 on this side. Levers 22 and 23 are each attached to a shaft 24 and 25 of a shock absorber 26 and 27, respectively, bolted to frame side member 15 and 16, respectively. Surrounding shaft 24 and firmly connected thereto is a tubular shaft or sleeve 28, one end of which is attached to a hub 29 of an oscillating vane 30 of a hydraulic clutch or coupling comprising a housing 31 in which said vane 30 is turnably mounted with a liquidtight fit. In Fig. 1 said hydraulic clutch is shown in section along the line I—I in Fig. 3 which figure now is also referred to. Formed on the inside of said housing 31 is a partition 32 bearing liquid tightly on hub 29 and dividing the interior of the hydraulic housing 31 into two hydraulic chambers 33 and 34 connected with one another by means of a duct 35 extending through hub 29 and sleeve 28.

Shock absorber shaft 25 on the opposite side which shaft is coaxial with shaft 24 is also fitted with a sleeve 36 provided at its end with a flange 37 bolted to housing 31. Sleeve 36 is journalled in a bracket 38 extending from cross member 17.

Fitting slidably and liquid tightly in the tubular sleeve 28 is a piston valve 39 having a cross duct 40 which in the position shown in Fig. 1 registers exactly with duct 35 in sleeve 28 and hub 29.

Slidably mounted on sleeve 28 is an outer sleeve 41 rigidly connected with valve 39 by means of a pin 42 sliding in longitudinal slots 43 in sleeve 28. A collar 44 formed integral with sleeve 41 and another collar 45 screwed onto said sleeve form guiding means for a heavy, fly-wheel-shaped disc 46 turnable in the groove formed by said collars and held in its central position by means of two coil springs 47 and 48 identical as to tension and size and wound around sleeve 28. Spring 47 abuts with its one end against collar 45 and with its other end against a collar 49 screwed onto sleeve 28, whereas spring 48 abuts with its one end against collar 44 and with its other end against a cover 50 of clutch housing 31.

In the central or middle position of disc 46 shown in Fig. 1 in which as stated above duct 35 in oscillating vane 30 of the hydraulic clutch registers exactly with duct 40 of piston valve 39, liquid is permitted to flow freely between chambers 33 and 34. Consequently, in this position relative turning movements are allowed between vane 30 and clutch housing 31 as a result of any relative movement between spring plate 11 or 12 and frame side member 15 or 16 on either side of the vehicle, as the liquid in the clutch may flow freely from the one chamber to the other, that is the two shock absorbers can act independently of each other. Evidently disc 46 will maintain this position provided the vehicle is travelling in a straight course. As soon as the vehicle deviates from its straight course, for instance by taking a curve or by skidding, the heavy disc 46 will against the action of springs 47 and 48 move in either direction in relation to sleeve 28 depending on the direction of the deviation of the vehicle, causing a corresponding displacement of piston valve 39 so that duct 40 in said valve will no longer register with duct 35 in vane 30. Evidently such relative movement between disc 46 and sleeve 28 depends on the inertia of said disc or, in other words, on the centrifugal force acting on the disc. Now no further communication will be allowed between the chambers 33 and 34 of the hydraulic clutch causing said clutch to act as a rigid coupling connecting shafts 24 and 25 of shock absorbers 26 and 27 rigidly to each other. In this position of the hydraulic clutch a turning of shafts 24 and 25 now acting as one rigid member, as a result of any relative movement between spring plate 11 or 12 and frame side member 15 or 16 on either side of the vehicle will evidently be transmitted to an identical relative movement between said parts on the other side of the vehicle, which constitutes an important advantage when taking curves as preventing side-swaying of the vehicle as well as when the vehicle is skidding as limiting such dangerous movements of the vehicle.

When the vehicle is returned to straight course, disc 46 is returned to its middle position by the action of the springs 47 and 48.

In the embodiment shown in Fig. 2 the heavy disc 46 shown in Fig. 1 and serving as actuator member for the hydraulic clutch 30, 31 is replaced by a centrifugal governor and means actuated by the steering wheel of the vehicle as will be more fully described in the following.

Also in this embodiment the stabiliator according to my invention comprises two shock absorbers 26 and 27 the shafts of which are connected by means of a hydraulic clutch or coupling similar to that described with reference to Fig. 1 but adapted to be actuated by said steering wheel actuated means and said centrifugal governor in a manner to be described later on.

Bolted to the frame side member 15 is a steering gear 51 having a downwardly extending steering lever 52 attached to its horizontal sector shaft 53. At its lower end the steering lever 52 is in known manner by a horizontal drag link connected with the steering knuckle lever of one of the front wheels (these parts not shown in the figure). Turnably attached to the lower portion of the steering lever 52 is a horizontal rod 54 the other end of which is provided with a vertical pin 55 arranged to slide in a slot 56 in a horizontal plate 57 extending from a lower flange of the frame side member 15. Pivoted at one of its ends on a stud 58 on said plate 57 is a lever 59 having at its other end a Y-shaped slot 60 engaged by said pin 55. By means of rod 54 angular movements of steering lever 52 are transmitted to similar movements of lever 59, the length of said rod 54 being so adjusted that in the middle position of steering lever 52 corresponding to a straight forward course of the vehicle lever 59 occupies its centre position represented by the line 61. Due to the Y-shape of slot 60 the angular movements of lever 59 are limited to an equal maximal deviation on either side of said centre line 61 represented by the angle 62 and 63, respectively, which angles can not be exceeded, if the angular movement of steering lever 59 is further increased.

Secured to the end of the speedometer shaft 64 driven in known manner from the transmission main shaft is a bevel gear 65 meshing with another bevel gear 66 secured to a shaft 67. Said shaft 67, the governor shaft, is journalled at one end in a support 68 extending from gear box 69 and at the other end in a bushing 70 supported by cross member 17.

In this embodiment sleeve 41 slidably mounted on sleeve 28 and connected with piston valve 39 by means of pin 42 sliding in slot 43 in sleeve 28 is provided with an annular groove 71 engaged by one end of a rod 72. Rod 72 is bent at right angle and has its other end secured to an armature 73 slidably arranged in a solenoid 74 carried by brackets 75 secured to cross member 17. Armature 73 is held in its off-centre position shown in the figure by the tension of a coil spring 76.

A bell crank lever 77 journalled in a bracket 78 secured to cross member 17 has its one arm connected with a rod 79 leading to the driver's seat and its other arm pivoted to rod 72. Thus, a pull at rod 79 will cause rod 72 to be moved against the action of spring 76 causing a displacement of piston valve 39 which in this manner may be actuated by hand from the driver's seat.

Shaft 67 carries a centrifugal governor, comprising a sleeve 80 attached to bevel gear 66 and another sleeve 81 slidably arranged on said governor shaft 67, both sleeves being connected with two dumbbell-shaped governor weights 82 by means of link rods 83. A coil spring 84 is wound around shaft 67 and bears against sleeves 80 and 81 so as to tend to maintain said sleeves in their apart position. If shaft 67 is rotated at a sufficient speed, weights 82 will be forced radially outwards under the action of centrifugal force, whereby link rods 83 will pull sleeve 81 towards sleeve 80 thereby compressing coil spring 84.

A plate 85 made of electrically non-conductive material is on its one side supported by a U-shaped bracket 86, for instance by means of screws and slots as shown at 87 in order to be adjustable with relation to said bracket for the purpose to be described later on. One shank 88 of said bracket 86 is slidably supported by shaft 67, whereas the other shank forms a fork 89 fitting into an annular groove 90 provided in a sleeve 81. On its opposite side plate 85 is supported by two studs 91 guided in a slot 92 in plate 57.

Set in plate 85 with its surface flush with that of said plate is another plate 93 of electrically conductive material having the shape of two symmetrically opposed wings connected at one end but separated at the opposite end by a deep, wedge-shaped insection of plate 85, thus of non-conductive material. An insulated cable 94 connects plate 93 with one end of the solenoid 74, the other end of which is connected with a storage battery by means of cable 95.

Secured to lever 59 and extending at right angles from the pivoted end of said lever is a lever 96 made of non-conductive material and carrying at its free end a contact piece 97. On the turning of lever 59, and, consequently, lever 96, said contact piece 97 will slide on the surfaces of plates 85 and 93. By means of an insulated cable 98 the contact piece is connected with the other battery terminal. If desired, a signal device, as for instance a lamp or a buzzer in the driver's compartment may be inserted in the electric circuit.

In the figure lever 96 is shown in its middle position represented by the line 99, said position corresponding to the straight forward position of the steering wheel. The angles $62^1$ and $63^1$ equal to angles 62 and 63 and designating the deviation of lever 59 represent the maximum angular deviation of lever 96 on either side of the middle line 99.

Before describing the action of the apparatus it will be necessary to refer to the dynamic formula by which the centrifugal force may be calculated and discussed. For a body of a weight of $P$ lbs. travelling at a speed of $v$ feet a second along a curved path having a radius of curvature of $R$ feet, the centrifugal force $C$ will be derived from the formula $$C = \frac{P \cdot v^2}{g \cdot R}$$

in which $g$ is the acceleration which a body would have towards the earth if allowed to fall freely. $g$ is equal to 32,2 feet per second per second. The centrifugal force $C$ is acting in the direction of a line in the plane of the curve extending through the centre of gravity of the body perpendicularly to said curve.

The application of this formula to the above apparatus is best illustrated by an example.

Figures 2, 3:
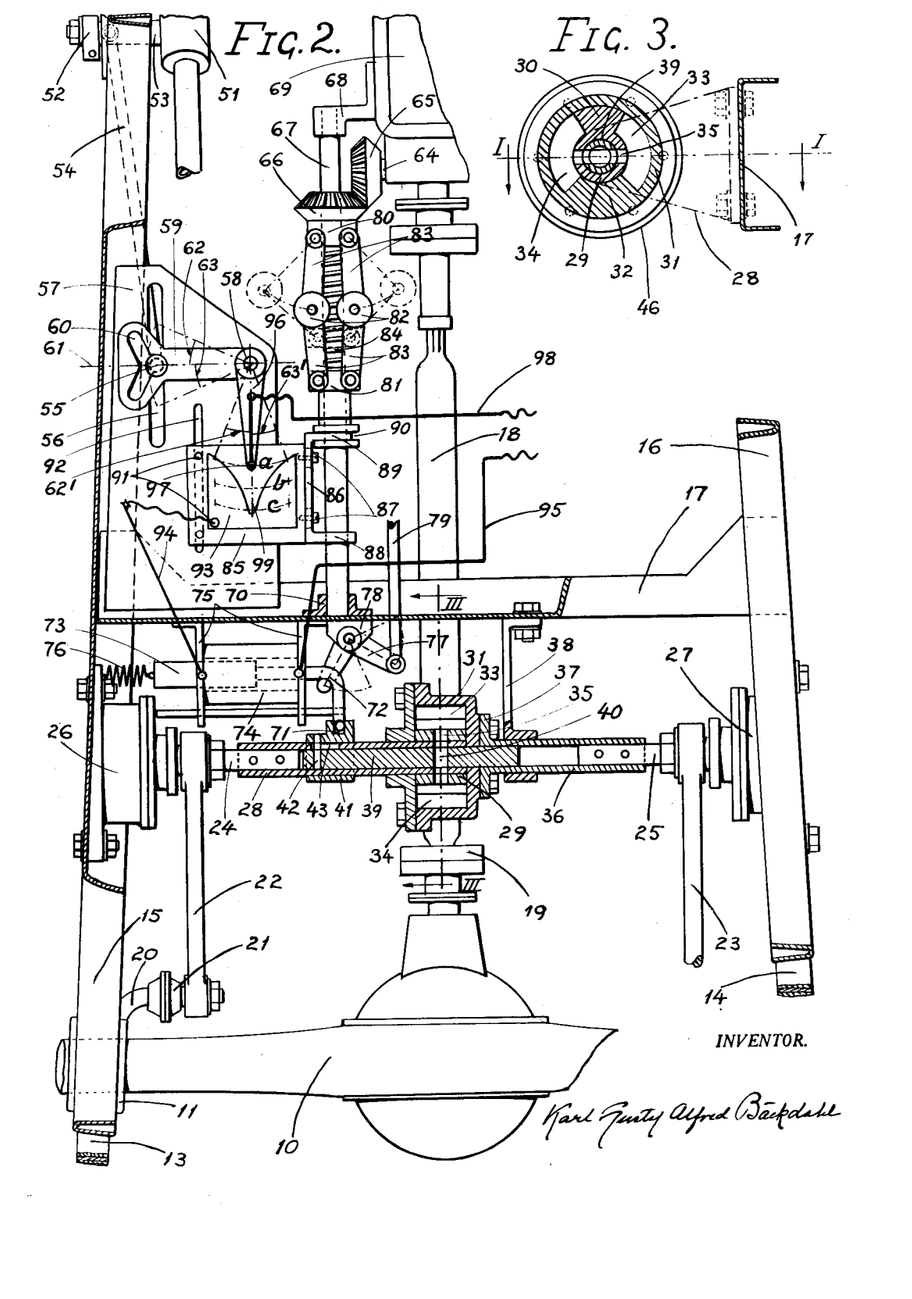
Figs. 2, 4 and 6 are similar views of the rear and middle portion of an automobile chassis showing each a further embodiment of an apparatus according to my invention applied to said chassis, said embodiments constituting further developments of the principle of my invention as described generally with reference to Fig. 1.
Fig. 3 is a sectional view along the line III—III of Fig. 1 or 2.

Supposing that in the automobile illustrated in Fig. 2 the total weight of all parts suspended by the springs is 2400 lbs. and that it has been found by actual tests that the maximum centrifugal force $C_1$ which may be permitted without the stabilizing apparatus coming into action is arrived at with a turning radius of the vehicle of 150 feet at a speed of 20 miles per hour=29,3 feet per second, this will give the equation $$C_1 = \frac{2400 \cdot 29,3^2}{32,2 \cdot 150} = 425 \text{ lbs.,}$$

consequently a quite considerable force at the relatively low speed of 20 miles per hour. Suppose furthermore that the governor is just on the point of getting into action at a speed of 20 miles per hour and that a turning radius of 150 feet corresponds to the maximum angular deviation of lever 96, represented by the angles $62^1$ and $63^1$, the contact piece 97 being in this position on the point of moving from the insection portion of plate 85 onto one of the wings of plate 93. It is evident that, when the speed is increased plates 85 and 93 will move towards contact piece 97 on account of the outward movement of centrifugal weights 82 causing said piece 97 to contact with plate 93 whereby the electric circuit is closed. The current will instantly energize solenoid 74 whereby armature 73 will be drawn towards the centre of the solenoid against the action of spring 76 causing rod 72 to move sleeve 14 and, consequently, piston valve 39 so that the duct 40 in the latter will no longer connect the two hydraulic chambers 33 and 34. The result will be that liquid can no longer flow between these chambers or, with other words, relative angular movements between on the one hand housing 31 connected with sleeve 36 and shaft 25 and on the other hand vane 30 connected with sleeve 28 and shaft 24 are no longer possible, said housing 31 and said vane 30 constituting a firm coupling between shafts 24 and 25, as soon as duct 35 is closed by the displacement of piston valve 39. It is readily understood that in this position of piston valve 39 a relative movement between spring plate and frame side member on one side of the vehicle will be instantly transmitted to an exactly similar movement between corresponding parts on the other side, whereby a stabilizing action is effected. On the other hand if the hydraulic coupling 30, 31 is disengaged, that is when piston valve 39 occupies its position with duct 40 effecting communication between the two hydraulic chambers 33 and 34 of said coupling, such a relative movement between spring plate and frame side member on the one side of the vehicle will be taken up by the hydraulic coupling 30, 31 and will consequently not be transmitted to the opposite side of the vehicle.

Let us furthermore suppose that the vehicle speed is doubled, i. e. is increased to 40 miles per hour. As the square of the velocity $v$ appears in the formula this would mean that the centrifugal force $C$ would be quadrupled, if the maximum steering angle were maintained. Thus at this velocity the permissible value $C_1$ of the centrifugal force will be attained already when the steering angle amounts to one quarter of the value permissible at 20 miles per hour and, consequently, the stabilizing apparatus should be set into operation already when this steering angle is exceeded. This is attained in the following way. At a speed of 40 miles per hour the governor shaft 67 is rotating at twice the speed as compared with at 20 miles per hour, whereby the weights 82 will pull sleeve 81 and thereby also plate 85 through a certain distance towards contact piece 97. Said contact piece 97 which at 20 miles per hour moved along an arc $a$ will now move along another arc $b$. By suitably calculating the curve of the wings of plate 93 only one quarter of the angular deviation of lever 96 required when contact piece 97 is moving along arc $a$ will be required for effecting contact of said piece 97 with plate 93 when piece 97 is moving along arc $b$ and, thus, set the stabilator into operation.

If the speed of the vehicle is further increased, for instance to 60 miles per hour, plate 93 is moved through another distance towards contact piece 97 by the governor action. The contact piece 97 will now move along an arc $c$ in such a relation to the wings of plate 93 that only one ninth of the angular motion of lever 96 at 20 miles per hour is required for effecting contact between contact piece 97 and plate 93 and, consequently for setting the stabilator into action.

At still higher speeds a very little movement of the steering wheel will put the stabilator into operation. It may even be advisable to have the plate 93 so designed that the stabilator is in constant operation when a certain high speed is attained. Further it will be possible by adjusting the position of plates 85 and 93 in relation to contact piece 97 by means of screws 87 to change the value C of the centrifugal force at which the stabilator is set into operation.

Evidently, when the electric current is broken, all parts actuated by the solenoid will return to original position under the action of spring 76.

Under certain road conditions, for instance on greasy or wet pavements or on roads covered with ice, it may sometimes be desirable to put the stabilator into action even though the vehicle is not taking curves. This may be effected from the driver's seat by a pull at rod 79 actuating bell crank lever 77 and piston valve 39 so as to interrupt the communication between the hydraulic chambers 33 and 34. This way of putting the stabilator into operation may also be used in emergency cases, for instance if some electrical parts have gone out of order.

Figures 4, 5:
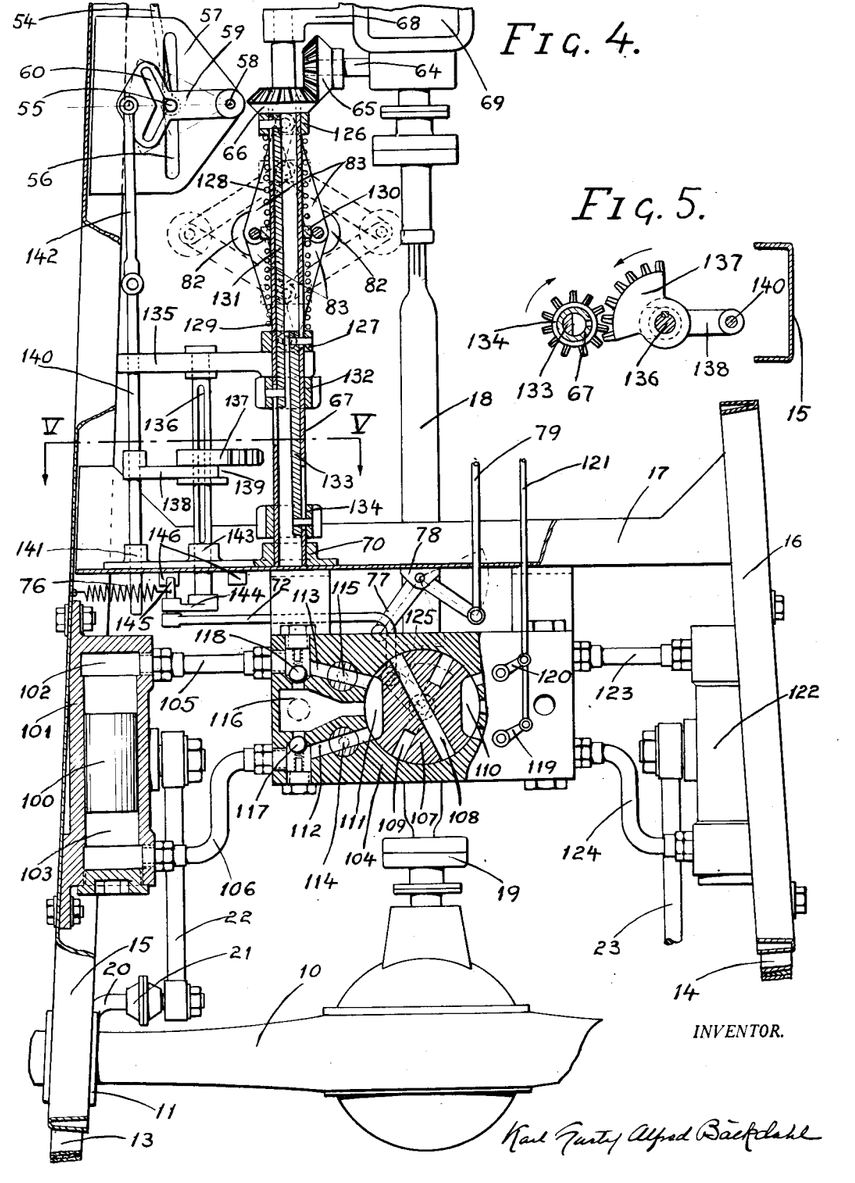
Fig. 5 is a sectional view along the line V—V in Fig. 4.

In the embodiment of my invention shown in Fig. 4 the stabilator is of the hydraulic type, comprising two hydraulic double-acting shock absorbers having each two hydraulic chambers and further comprising an intermediate valve by means of which said four hydraulic chambers may be crosswisely connected. In this case the means for setting the stabilator into operation comprises a centrifugal governor of somewhat different design as compared with that shown in Fig. 1 and purely mechanical means for actuating the stabilator valve from the steering wheel. Lever 22 is connected to a double-ended piston 100 of a shock absorber comprising a cylinder 101 in which said piston 100 is sliding with a liquid-tight fit dividing the interior of the cylinder into two hydraulic chambers 102 and 103. The intermediate valve comprises a valve housing 104 having on its one side two ducts 113 and 112 communicating with said hydraulic chambers 102 and 103 by means of pipes 105 and 106, respectively. Arranged in each of said ducts 112 and 113 are ride control valves 114 and 115, respectively, and a ball check valve 117 and 118, respectively, said ride control valves 114, 115 controlling the cross sectional area of ducts 112 and 113, whereas the ball check valves 117 and 118 control the liquid flow from a supply tank 116 formed in the valve housing 104.

Turnably arranged in valve housing 104 with a liquid-tight fit is a rotary valve 107 having two ducts 108 and 109 crossing each other and two diametrically opposed pockets 110 and 111. In the position shown in the figure pocket 111 connects ducts 112 and 113 with one another and also communicates with supply tank 116.

On the opposite side of the vehicle rod 23 is connected with a hydraulic shock absorber 122 similar to that above described and clamped to frame side member 16, the two hydraulic chambers of said shock absorber 122 being in the same manner as those of absorber 101 connected with valve housing 104 by means of pipes 123 and 124 and ducts controlled by ride control valves and ball check valves (these latter parts not seen in the drawings). The ride control valves of each shock absorber are adapted to be set from the driver's seat as shown with respect to the valves of shock absorber 122, each of said valves being actuated by an arm 119 and 120, respectively, said arms being connected to a common setting rod 121.

Attached to the rotary valve 107 on the underside thereof is an arm 125 by means of which said valve may be turned for the purpose to be described later on. Pivotally connected to said arm 125 at the free end thereof is the bent rod 72 adapted to be actuated either manually by means of bell crank lever 77 and rod 79 extending to the driver's seat, or automatically by means of the centrifugal governor and the steering wheel actuated means in a manner to be now described.

The weights 82 of the centrifugal governor are by means of the links 83 connected with two sleeves 126 and 127 slidably mounted on the governor shaft 67 which in this embodiment is hollow. Arranged between each of said sleeves 126 and 127 and a collar 130 fixed to shaft 67 is a coil spring 128 and 129, respectively, wound around said shaft 67 and identical as to tension and size. A rod 131 slidable in hollow shaft 67 connects sleeve 126 with a gear 132 and another rod 133 also slidable in said hollow shaft 67 connects sleeve 127 with a gear 134, said gears 132 and 134 being mounted to slide on shaft 67. When weights 82 are forced outwards due to centrifugal force sleeves 126 and 127 will slide uniformly towards each other while compressing springs 128 and 129 causing gears 132 and 134 to be moved towards each other.

Secured to frame side member 15 is a support 135 which serves to support governor shaft 67. Journalled in said support 135 is another shaft 136 parallel to shaft 67 and carrying a gear sector 137 mounted to slide on said shaft 136 but to rotate therewith, a fork 138 engaging an annular groove 139 in the hub of said gear sector 137 (see also Fig. 5). Fork 138 is secured to a rod 140 slidably mounted in support 135 and in a bearing 141 on cross member 17 pivotally connected to a link 142 movably connected to the lever 59 of the steering wheel actuated device of substantially the same design as that shown in the previous embodiment.

Shaft 136 extends through a bushing 143 secured to cross member 17 and has secured to its end a crank 144 connected at its free end to the above mentioned valve actuating rod 72, a pin 145 on said rod engaging a hole in said crank 144. The turning movements of shaft 136 and crank 144 are limited by two abutments 146 engaged by said pin 145 in the outermost positions of the crank 144. Spring 76 maintains rod 72 in the position shown in Fig. 4 in which pin 145 bears against one of the abutments 146.

The action of the apparatus is easily understood. In the position shown in Fig. 4 the two hydraulic shock absorbers 101 and 122 are acting independently of one another in known manner, it being possible by adjusting ride control valves to set said shock absorbers to suit different running conditions as also previously known. By turning rotary valve 107 through an angle of about 90 degrees said valve will assume a position in which cross ducts 108 and 109 register with ducts 112 and 113 and corresponding ducts on the opposite side of the valve housing 104 in such manner as to connect the four hydraulic chambers of the two shock absorbers crosswisely, thus pipe 105 with pipe 124 and pipe 106 with pipe 123. As the two shock absorbers are identical it will be seen that a relative movement between spring plate and frame side member on one side of the vehicle will be transmitted to an equal relative movement between said parts on the other side of the vehicle effecting a stabilization of the vehicle in a manner above set forth.

As mentioned above this turning of rotary valve 107 may be effected manually by a pull on rod 79 but it may also be effected automatically in the following manner. At a given turning angle and a given speed of the vehicle gear sector 137 will be engaged by one of the gears 132 or 134 causing the sector and, consequently, shaft 136 to be turned through an angle determined by the peripheral extension of said sector, the sector 137 being then disengaged and riding on gear 132 or 134. This turning movement is transmitted to rotary valve 107 by means of crank 144, rod 72 and arm 125. The angle through which shaft 136 is turned by the engagement of sector 137 with one of gears 132 or 134 is adapted to correspond to the angle through which rotary valve is to be turned to assume the position in which the crosswise connection of the two shock absorbers is effected or to the angle between the two abutments 146. When the steering angle or the speed of the vehicle or both is reduced the engagement of sector 137 with one of gears 132 or 134 will cease and then the parts including rotary valve 107 are returned to starting position by means of spring 76.

Figure 6:
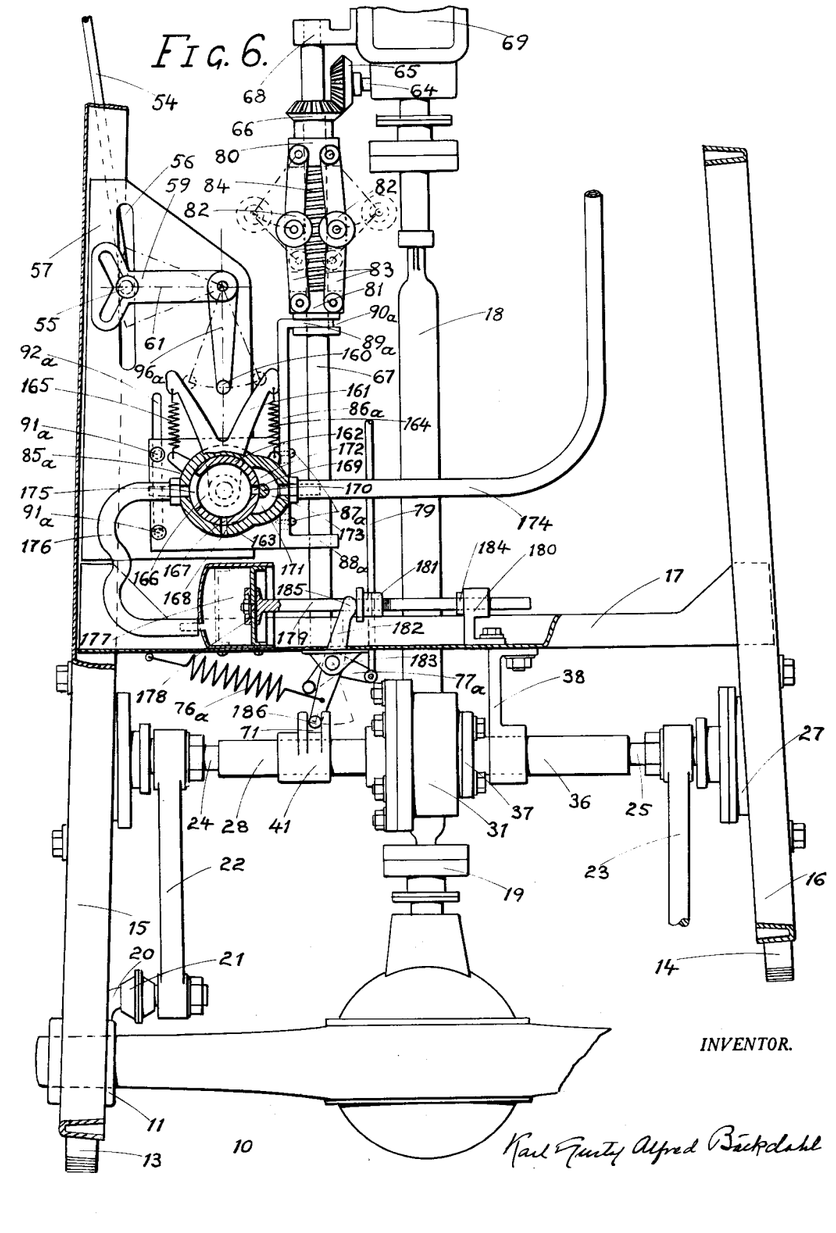

Finally, in Fig. 6 a still further embodiment of my invention is shown, in which the suction from the intake manifold of the motor is utilized for setting the stabilizing apparatus into action. In this figure all parts belonging to the automobile chassis, shock absorbers, hydraulic coupling, centrifugal governor and parts actuated by steering lever 54 including lever 59 are identical with corresponding parts shown in Fig. 2. Although not being identical with corresponding parts in Fig. 2, several other parts serve similar purposes in Fig. 6, as in Fig. 2 and have for this reason in Fig. 6 been designated by the same reference numerals as in the embodiment shown in Fig. 2 with an index character $a$ added to such numerals.

Attached to lever 59 and extending at right angle from the pivoted end of said lever is the lever 96a carrying at its free end a pin 160, adapted when turned into operative position, to bear against the inside surface of one of the shanks of a V-shaped lever 161. Lever 161 is adapted to actuate a pneumatic valve comprising a valve housing 163 and a cylindrical hollow valve body 162 mounted to turn in said housing with an airtight fit. Valve housing 163 is mounted on the slidable plate 85a by means of studs 91a on said plate engaging the slot 92a in plate 57. On its opposite side plate 85a is supported by the U-shaped bracket 86a, for instance by means of screws and slots as shown at 87a, in order to be adjustable with relation to said bracket. One shank 88a of bracket 86a is slidably supported by shaft 67, whereas the other shank forms a fork 89a engaging an annular groove 90a provided in sleeve 81 of the centrifugal governor.

In the figure V-shaped lever 161 occupies its middle position held in this position by means of two coil springs 164 and 165, identical as to size and tension, each spring having its one end attached to one shank of the V-shaped lever 161 and its other end to valve housing 163.

In the position shown the space 166 within the hollow valve body 162 communicates with the atmosphere by a passage 167 in valve body 162 and a registering passage 168 in housing 163, whereas another passage 169 in valve body 162 is closed by a partition 170 provided in valve housing 163 and separating two openings 171 and 172 of a pocket 173 in said housing connected by means of a flexible hose 174 with the motor intake manifold. Another opening 175 in valve body 162 effects permanent communication by means of a flexible hose 176 between valve chamber 166 and a vacuum cylinder 177 open at one of its ends and bolted to cross member 17. Slidably mounted with an air-tight fit in said cylinder 177 is a piston 178 and secured thereto is one end of a piston rod 179 having its other end slidably mounted in a support 180 secured to cross member 17, a collar 184 formed on the rod 179 limiting the endwise movement thereof in one direction. Turnably mounted in a bracket 183 secured to cross member 17 is a double-armed lever 182 having its one end 185 shaped as a fork embracing piston rod 179 and bearing on a collar 181 adjustably mounted on said rod, whereas the other end 186 of lever 182 engages the annular groove 71 in sleeve 41 connected as before with the piston valve of the hydraulic coupling 31.

Turnably mounted in said bracket 183 is the manually actuated bell crank lever 77a having its one arm connected with rod 79 leading to the driver's seat and its other arm in bearing engagement with one arm of lever 182. Return coil spring 76a acts to keep lever 182 in the position shown in the drawings in which the stabilizing apparatus is disengaged.

The operation of this embodiment is substantially similar to that of the embodiment described with reference to Fig. 2, except the stabilator being in this case set into action pneumatically. When the vehicle is taking a curve rod 54 which is connected with the steering gear of the car as described above, will effect an angular movement of lever 59 and thereby also of lever 96a. If this angular movement is sufficient to effect contact between pin 160 and one of the shanks of V-shaped lever 161, the latter will, if the angular displacement of lever 96a is still increased, be turned through a certain angle, thereby also turning valve body 162, which will close the atmosphere passages 167 and 168 and open one of the vacuum passages 171 or 172, resulting in an immediate evacuation of chamber 166, hose 176 and vacuum cylinder 177, due to the vacuum prevailing in the intake manifold of the motor. Thereby the atmospheric pressure acting on piston 178 will force said piston inwardly causing piston rod 178 by means of collar 181 to turn lever 182 in counter-clockwise direction as seen in the figure against the tension of spring 76a moving sleeve 41 and, consequently, also piston valve 39 so as to lock the hydraulic coupling 31 in the manner previously described causing the stabilator to be set into operation.

It will be readily apparent from the figure that, if the vehicle speed is increased, the governor will move plate 85a and thereby also valve 162 and V-shaped lever 161 towards pin 160 at the free end of lever 96a thereby permitting earlier contact between said pin 160 and one of the shanks of V-shaped lever 161. This will bring about an earlier functioning of the stabilator, i. e. a smaller angular movement of the steering wheel will be sufficient to set the stabilator into operation.

It is evident that my invention may be applied also to vehicles in which two wheels are each provided with a shock absorber by combining said absorbers according to the principle of my invention and by providing means to control the connection of said shock absorbers with one another.

It is a well known fact that the latest type of hydraulic shock absorbers provided with so called ride control have a certain stabilizing action especially when the ride control is set to give "firm riding", i. e. when the ride control valve is set to offer the greatest liquid resistance. This will afford a certain resistance to side-swaying caused by sudden turning or skidding but will not prevent the frame and body of a vehicle from eventually tilting over when travelling through a long curve subjecting said parts of the vehicle to the action of centrifugal force during a certain length of time.

It is obvious that the controlling means according to my present invention as described in the foregoing may also be used for setting the ride control valve of a shock absorber into its position for firm riding thereby causing a certain stabilizing action to get into operation. Such a combination will of course come within the scope of my present invention.

It is obvious that the controlling means of my present invention may be generally applied to vehicle stabilizing devices of any kind.

Having thus described my invention what I claim and desire to protect by Letters Patent is:

1. In a vehicle having a frame and two opposed wheels carrying said frame and each carried by a wheel carrying member permitting relative movements between the frame and the corresponding wheel, means including communicating fluid systems to transmit a relative movement between the frame and the wheel on one side of the vehicle to an equal relative movement between the frame and the wheel on the opposite side of the vehicle, and means to control the communication between the systems of said transmitting means automatically.

2. In a vehicle having a frame and two opposed wheels carrying said frame and each carried by a wheel carrying member permitting relative movements between the frame and the corresponding wheel, means including communicating fluid systems to transmit a relative movement between the frame and the wheel on one side of the vehicle to an equal relative movement between the frame and the wheel on the other side of the vehicle, and automatically operating controlling means to put said transmission means into action, when acted upon by a factor varying with the running conditions of the vehicle.

3. In a vehicle having a frame and two opposed wheels carrying said frame and each carried by a wheel carrying member permitting relative movements between the frame and the corresponding wheel, means including communicating fluid systems to transmit a relative movement between the frame and the wheel on one side of the vehicle to an equal relative movement between the frame and the wheel on the opposite side of the vehicle, and controlling means for said transmitting means adapted automatically to put same into action, when acted upon by the speed of the vehicle.

4. In a vehicle having a frame and two opposed wheels carrying said frame and each carried by a wheel carrying member permitting relative movements between the frame and the corresponding wheel, means including a pair of fluid systems to transmit a relative movement between the frame and the wheel on one side of the vehicle to an equal relative movement between the frame and the wheel on the opposite side of the vehicle, and controlling means for said transmitting means adapted automatically to put same into action, when acted upon by the steering angle of the vehicle.

5. In a vehicle having a frame and two opposed wheels carrying said frame and each carried by a wheel carrying member permitting relative movements between the frame and the corresponding wheel, means including a pair of communicating fluid systems to transmit a relative movement between the frame and the wheel on one side of the vehicle to an equal relative movement between the frame and the wheel on the other side of the vehicle, and controlling means for said transmitting means adapted automatically to put same into action, when acted upon by the centrifugal force set up by a factor varying with the running conditions of the vehicle.

6. In a vehicle having a frame and two opposed wheels carrying said frame and each carried by a wheel carrying member permitting relative movements between the frame and the corresponding wheel, means to transmit a relative movement between the frame and the wheel on one side of the vehicle to an equal relative movement between the frame and the wheel on the opposite side of the vehicle, and a plurality of means acting independently of each other to control said transmitting means.

7. In a vehicle having a frame and two opposed wheels carrying said frame and each carried by a wheel carrying member permitting relative movements between the frame and the corresponding wheel, means including a pair of communicating fluid systems to transmit a relative movement between the frame and the wheel on one side of the vehicle to an equal relative movement between the frame and the wheel on the other side of the vehicle, and controlling means for said transmitting means adapted to be acted upon by a factor varying with the running conditions of the vehicle and to put said transmitting means into action, when said factor exceeds a given value.

8. In a vehicle having a frame and two opposed wheels carrying said frame and each carried by a wheel carrying member permitting relative movements between the frame and the corresponding wheel, means to transmit a relative movement between the frame and the wheel on one side of the vehicle to an equal relative movement between the frame and the wheel on the opposite side of the vehicle, automatically operating means to control said transmitting means and manually operable means to control said transmitting means.

9. In a vehicle having a frame and two opposed wheels carrying said frame and each carried by a wheel carrying member permitting relative movements between the frame and the corresponding wheel, means to transmit a relative movement between the frame and the wheel on one side of the vehicle to an equal relative movement between the frame and the wheel on the opposite side of the vehicle, automatically operating controlling means for said transmitting means adapted to be acted upon by a factor varying with the running conditions of the vehicle and to put said transmitting means into action, when said factor exceeds a given value, and means to adjust said controlling means to vary the value of the factor at which the controlling means puts the transmitting means into action.

10. In a vehicle having a frame and two opposed wheels carrying said frame and each carried by a wheel carrying member permitting relative movements between the frame and the corresponding wheel, means to transmit a relative movement between the frame and the wheel on one side of the vehicle to an equal relative movement between the frame and the wheel on the other side of the vehicle, and adjustable means automatically to put said transmitting means into and out of action.

11. In a vehicle having a frame and two opposed wheels carrying said frame and each carried by a wheel carrying member permitting relative movements between the frame and the corresponding wheel, means comprising a movable member to transmit a relative movement between the frame and the wheel on one side of the vehicle to an equal relative movement between the frame and the wheel on the other side of the vehicle, mechanical means to control said movable member to put said transmitting means into and out of action, and means actuated in accordance with variance of the running conditions of the vehicle for acting upon said control means.

12. In a vehicle having a frame and two opposed wheels carrying said frame and each carried by a wheel carrying member permitting relative movements between the frame and the corresponding wheel, means comprising a movable member to transmit a relative movement between the frame and the wheel on one side of the vehicle to an equal relative movement between the frame and the wheel on the other side of the vehicle, and electric means to control said movable member to put said transmitting means into and out of action, said controlling means being adapted to be acted upon by a factor varying with the running conditions of the vehicle.

13. In a vehicle having a frame and two opposed wheels carrying said frame and each carried by a wheel carrying member permitting relative movements between the frame and the corresponding wheel, means comprising a movable member to transmit a relative movement between the frame and the wheel on one side of the vehicle to an equal relative movement between the frame and the wheel on the other side of the vehicle, and pneumatic means to control said movable member to put said transmitting means into and out of action, said controlling means being adapted to be acted upon by a factor varying with the running conditions of the vehicle.

14. In a vehicle having a frame and two opposed wheels carrying said frame and each carried by a wheel carrying member permitting relative movements between said frame and the corresponding wheel, a cross shaft consisting of two co-axial parts and mounted to turn in one kind of such relatively movable parts and movably connected to the other kind of such parts, means to rigidly connect said shaft parts to each other so that a relative movement between the frame and the wheel on one side of the vehicle will cause an equal movement between the frame and the wheel on the other side of the vehicle, and means to control said connecting means.

15. In a vehicle having a frame and two opposed wheels carrying said frame and each carried by a wheel carrying member permitting relative movements between said frame and the corresponding wheel, a cross shaft consisting of two co-axial parts and mounted to turn in one kind of such relatively movable parts and movably connected to the other kind of such parts, means including a hydraulic clutch to rigidly connect said shaft parts to each other so that a relative movement between the frame and the wheel on one side of the vehicle will cause an equal movement between the frame and the wheel on the other side of the vehicle, and means to control said hydraulic clutch.

16. In a vehicle having a frame and two opposed wheels carrying said frame and each carried by a wheel carrying member permitting relative movements between said frame and the corresponding wheel, a cross shaft consisting of two co-axial parts and mounted to turn in one kind of such relatively movable parts and movably connected to the other kind of such parts, means including a hydraulic clutch to rigidly connect said shaft parts to each other so that a relative movement between the frame and the wheel on one side of the vehicle will cause an equal movement between the frame and the wheel on the other side of the vehicle and controlling means for said hydraulic clutch adapted to be acted upon by a factor varying with the running conditions of the vehicle and to put said hydraulic clutch into action to connect said shaft parts, when said factor exceeds a given value.

17. In a vehicle having a frame and two opposed wheels carrying said frame and each carried by a wheel carrying member permitting relative movements between the frame and the corresponding wheel, means including an adjustable member to transmit a relative movement between the frame and the wheel on one side of the vehicle to an equal relative movement between the frame and the wheel on the opposite side of the vehicle, and means to control said adjustable member, said controlling means comprising two members movable in relation to each other and adapted, in a position of their relative displacement, to put said transmitting means into action.

18. In a vehicle having a frame and two opposed wheels carrying said frame and each carried by a wheel carrying member permitting relative movements between the frame and the corresponding wheel, means including an adjustable member to transmit a relative movement between the frame and the wheel on one side of the vehicle to an equal relative movement between the frame and the wheel on the opposite side of the vehicle, and controlling means for said adjustable member, said controlling means comprising two members movable in relation to each other and adapted to be displaced the one under the action of the speed of the vehicle and the other under the action of the steering angle of the vehicle, and to be brought into engagement with each other, in a position of their relative displacements, to set said adjustable member thereby putting said transmitting means into action.

19. In a vehicle having a frame and two opposed wheels carrying said frame and each carried by a wheel carrying member permitting relative movements between the frame and the corresponding wheel, means including an adjustable member to transmit a relative movement between the frame and the wheel on one side of the vehicle to an equal relative movement between the frame and the wheel on the opposite side of the vehicle, and means to control said adjustable member, said controlling means comprising a normally open electric circuit including two contact members movable in relation to each other under the action of a factor varying with the running conditions of the vehicle and adapted, when said factor exceeds a given value, to close said circuit thereby setting said adjustable member to put said transmitting means into action.

20. In a vehicle having a frame and two opposed wheels carrying said frame and each carried by a wheel carrying member permitting relative movements between the frame and the corresponding wheel, means including an adjustable member to transmit a relative movement between the frame and the wheel on one side of the vehicle to an equal relative movement between the frame and the wheel on the opposite side of the vehicle, and controlling means for said adjustable member, said controlling means comprising two members movable in relation to each other under the action of a factor varying with the running conditions of the vehicle and further comprising a lever system connecting one of said members with said adjustable member to set the latter, in a position of displacement of said members, thereby putting said transmitting means into action.

21. In a vehicle having a frame and two opposed wheels carrying said frame and each carried by a wheel carrying member permitting relative movements between the frame and the corresponding wheel, means including an adjustable member to transmit a relative movement between the frame and the wheel on the one side of the vehicle to an equal relative movement between the frame and the wheel on the opposite side of the vehicle, and controlling means for said adjustable member, said controlling means comprising two members movable in relation to each other under the action of a factor varying with the running conditions of the vehicle and pneumatic means to connect one of said members with the adjustable member to set the latter, in a position of displacement of said members, thereby putting said transmitting means into action.

22. In a vehicle having a frame, wheels carrying said frame and each carried by a wheel carrying member permitting relative movements between the frame and the corresponding wheel, a shock absorber interposed between a wheel carrying member and said frame to damp such relative movements, and means to control said shock absorber, said controlling means being adapted to be acted upon by a factor varying with the running conditions of the vehicle and automatically to vary the action of said shock absorber, when said factor exceeds a given value.

23. In a vehicle having a frame and two opposed wheels carrying said frame and each carried by a wheel carrying member permitting relative movements between said frame and the corresponding wheel, a shock absorber on each side of the vehicle interposed between the frame and the corresponding wheel carrying member to damp such relative movements, means including an adjustable hydraulic clutch to connect said shock absorbers with each other, said hydraulic clutch being adapted in its normal position to permit said shock absorbers to act independently of each other, and means to control said hydraulic clutch adapted to be acted upon by a factor varying with the running conditions of the vehicle and to set said clutch so as to cause the shock absorber actually not actuated to effect a similar action as that of the shock absorber actually actuated, when said factor exceeds a given value.

24. In a vehicle having a frame and two opposed wheels carrying said frame and each carried by a wheel carrying member permitting relative movements between the frame and the corresponding wheel, two hydraulic shock absorbers each interposed between the frame and a wheel carrying member to damp such relative movements, each shock absorber having a compression chamber and a rebound chamber, a hydraulic valve device including a valve housing and a movable valve body, said valve housing having a channel and a supply chamber for each of said shock absorbers to connect the two chambers thereof with one another, each of said channels including a ride control valve to vary the flow therethrough and a check valve to control the connection between the channel and the supply chamber, whereas said valve body has channels adapted, in a certain position of said valve body, to connect the compression chamber of the one shock absorber with the rebound chamber of the other shock absorber and vice versa.

25. In a vehicle having 'a frame and two opposed wheels carrying said frame and each carried by a wheel carrying member permitting relative movements between the frame and the corresponding wheel, two hydraulic shock absorbers each interposed between the frame and one of said wheel carrying members and adapted to damp such relative movements, a hydraulic valve device including a valve housing and a movable valve body, said valve housing having a channel controlled by a ride control valve for each of said shock absorbers to connect the two chambers thereof with one another, whereas said valve body has channels adapted, in a certain position of said valve body, to connect the compression chamber of the one shock absorber with the rebound chamber of the other shock absorber and vice versa, and means adapted to be acted upon by a factor varying with the running conditions of the vehicle to move said valve body into the above said position, when said factor exceeds a given value.

26. In a vehicle having a frame and two opposed wheels carrying said frame and each carried by a wheel carrying member permitting relative movements between the frame and the corresponding wheel, two hydraulic shock absorbers each interposed between the frame and a wheel carrying member to damp such relative movements, each shock absorber having a compression chamber and a rebound chamber, a hydraulic valve device including a valve housing and a movable valve body, said valve housing having a channel for each of said shock absorbers to connect the two chambers thereof with one another, whereas said valve body has channels adapted, in a certain position of said valve body, to connect the compression chamber of the one shock absorber with the rebound chamber of the other shock absorber and vice versa.

27. In a vehicle having a frame and two opposed wheels carrying said frame and each carried by a wheel carrying member permitting relative movements between the frame and the corresponding wheel, means comprising a movable member to transmit a relative movement between the frame and the wheel on one side of the vehicle to equal relative movement between the frame and the wheel on the other side of the vehicle, and inertia means to control said movable member to put said transmitting means into and out of action, said control means being adapted to be acted upon by a factor varying with the running conditions of the vehicle.

28. In a vehicle having a frame and two opposed wheels carrying said frame and each carried by a wheel carrying member permitting relative movements between the frame and the corresponding wheel, means to transmit a relative movement between the frame and the wheel on one side of the vehicle to equal relative movement between the frame and the wheel on the opposite side of the vehicle, controlling means for said transmitting means, and means acted upon in response to change in the steering angle of the vehicle for actuating said controlling means to automatically put said transmitting means into action.

29. In a vehicle having a frame and two opposed wheels carrying said frame and each carried by a wheel carrying member permitting relative movements between the frame and the corresponding wheel, means including a pair of communicating fluid systems to transmit a relative movement between the frame and the wheel on one side of the vehicle to an equal relative movement between the frame and the wheel on the other side of the vehicle, and means for controlling communication between said pair of fluid systems, and means responsive to centrifugal force for actuating said controlling means and thereby put said transmitting means into or out of action.

30. In a vehicle having a frame and two opposed wheels carrying said frame and each carried by a wheel carrying member permitting relative movements between the frame and the corresponding wheel, means including a pair of communicating fluid systems to transmit a relative movement between the frame and the wheel on one side of the vehicle to an equal relative movement between the frame and the wheel on the opposite side of the vehicle, control means for the movement of fluid between said pair of fluid systems, and means responsive to vehicle speed for actuating said control means.

31. In a vehicle having a frame and two opposed wheels carrying said frame and each carried by a wheel carrying member permitting relative movements between the frame and the corresponding wheel, means comprising a movable member to transmit a relative movement between the frame and the wheel on one side of the vehicle to an equal relative movement between the frame and the wheel on the other side of the vehicle, electric means to control said movable member to put said transmitting means into and out of action, and means responsive to a factor varying with the running conditions of the vehicle for controlling said electric means.

32. In a vehicle having a frame member and two opposed wheels carrying said frame member and each carried by a wheel carrying member permitting relative movements between said frame member and the corresponding wheel, a cross shaft comprising two coaxial parts mounted to turn on one of said members and movably connected to the other of said members, means including a hydraulic clutch to interconnect the said shaft parts so that a relative movement between the frame member and the wheel on one side of the vehicle will cause a substantially equal movement between the frame member and the wheel on the other side of the vehicle, and automatically operated means to control the action of said clutch.

KARL GUSTAF ALFRED BÄCKDAHL.